US008869131B2

(12) United States Patent
Wang et al.

(10) Patent No.: US 8,869,131 B2
(45) Date of Patent: Oct. 21, 2014

(54) METHOD AND APPARATUS FOR DOWNGRADING FIRMWARE IN A CONTROLLER

(75) Inventors: Yuanru Frank Wang, Broomfield, CO (US); Monte Scott Gilstrap, Lafayette, CO (US)

(73) Assignee: Dot Hill Systems Corporation, Longmont, CO (US)

( * ) Notice: Subject to any disclaimer, the term of this patent is extended or adjusted under 35 U.S.C. 154(b) by 287 days.

(21) Appl. No.: 13/156,567

(22) Filed: Jun. 9, 2011

(65) Prior Publication Data

US 2012/0317562 A1 Dec. 13, 2012

(51) Int. Cl.
*G06F 9/445* (2006.01)

(52) U.S. Cl.
CPC ........................................ *G06F 8/65* (2013.01)
USPC ............................ 717/170; 717/177; 717/178

(58) Field of Classification Search
CPC .......................................................... G06F 8/65
USPC ................. 717/168–178; 714/3, 27, 36, 47.3; 710/305, 311, 315
See application file for complete search history.

(56) References Cited

U.S. PATENT DOCUMENTS

| | | | | |
|---|---|---|---|---|
| 5,504,801 | A * | 4/1996 | Moser et al. | 379/29.01 |
| 7,386,845 | B1 | 6/2008 | Fox et al. | |
| 7,603,669 | B2 * | 10/2009 | Curtis et al. | 717/174 |
| 7,890,950 | B1 * | 2/2011 | Nanavati et al. | 717/174 |
| 2003/0066066 | A1 * | 4/2003 | Nguyen et al. | 717/178 |
| 2004/0255291 | A1 * | 12/2004 | Sierer et al. | 717/174 |
| 2005/0114853 | A1 | 5/2005 | Glider et al. | |
| 2010/0058316 | A1 * | 3/2010 | Ha et al. | 717/170 |
| 2011/0055484 | A1 * | 3/2011 | Eichenberger et al. | 711/125 |

OTHER PUBLICATIONS

Ploski, Jan, et al. "Introducing version control to database-centric applications in a small enterprise." software, IEEE 24.1 (2007): pp. 338-344.*

* cited by examiner

*Primary Examiner* — Satish Rampuria
(74) *Attorney, Agent, or Firm* — Thomas J. Lavan

(57) ABSTRACT

A method for downgrading firmware in a controller is provided. The method includes receiving a request, by the controller, to downgrade the firmware from a current version to an older version. For a feature implemented in the current version and not implemented in the older version, the method includes determining if the feature is currently in-use by the controller. If the feature is currently in-use by the controller, the method includes warning a user and abandoning the request. If the feature is not currently in-use by the controller, the method includes checking other features implemented in the current version and not implemented in the older version, and repeating determining, providing, abandoning, and checking, and downgrading the firmware, if all of the features implemented in the current version and not implemented in the older version are not currently in-use by the controller.

20 Claims, 13 Drawing Sheets

100
120 Storage device bus
128 Host bus or network
Host
104
Storage
controller
108
Storage subsystem 124
Storage
device 116a
Storage
device 116b
Management
computer
112
132 Management bus or network 136
128 Host bus or network
Storage
controller
108a
120 Storage device bus
Host
104
Storage subsystem 124
Storage
device 116a
Storage
device 116b
Storage
controller
108b
140 Inter-controller bus Fig. 2a normal code upgrade
200
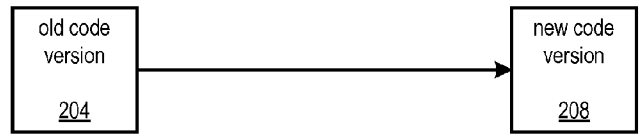
Fig. 2b normal code downgrade
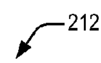
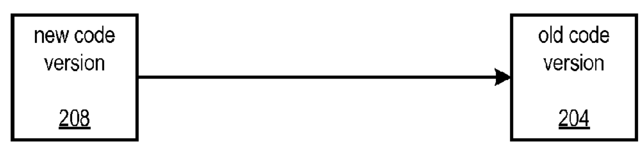

Fig. 2c version-blocked code downgrade
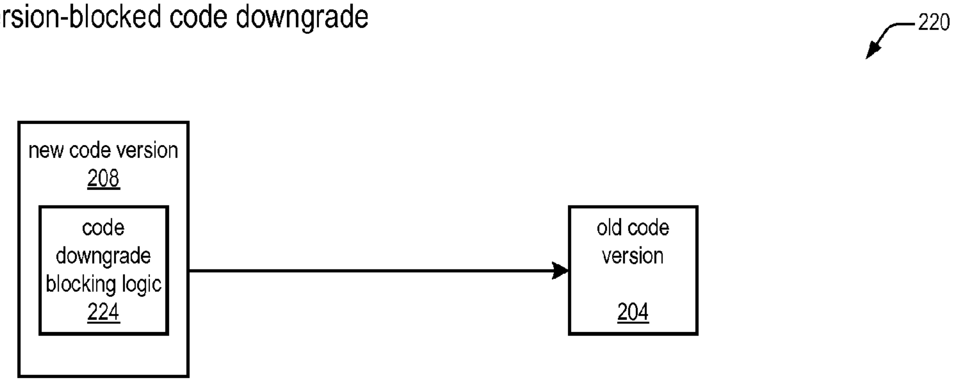
Fig. 2d modified code downgrade
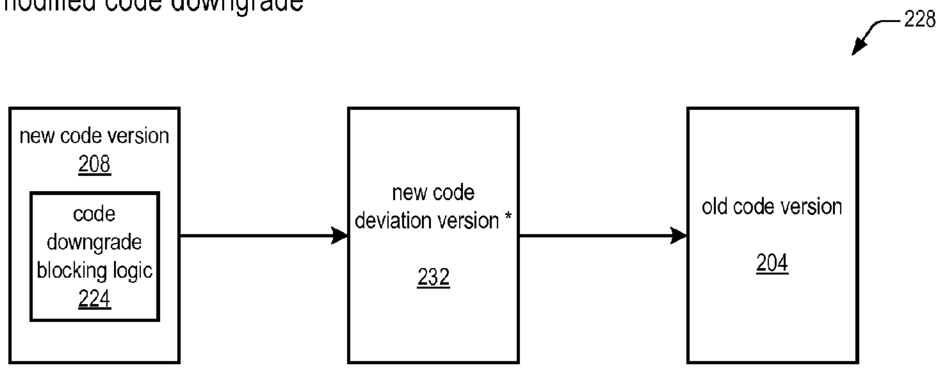
* new code deviation version same as new code but removes code downgrade blocking logic 108
128 Host bus or network
120 Storage device bus
Host interface
312
Device interface
316
324 I/O bus
Management interface
320
132 Management bus or network
Processor
304
328 memory bus
308 Memory
Feature scoreboard
340
In-use scoreboard
344
Firmware 336
Version number 348
Time stamp 352
Code upgrade/downgrade logic 356
Code downgrade blocking logic 360

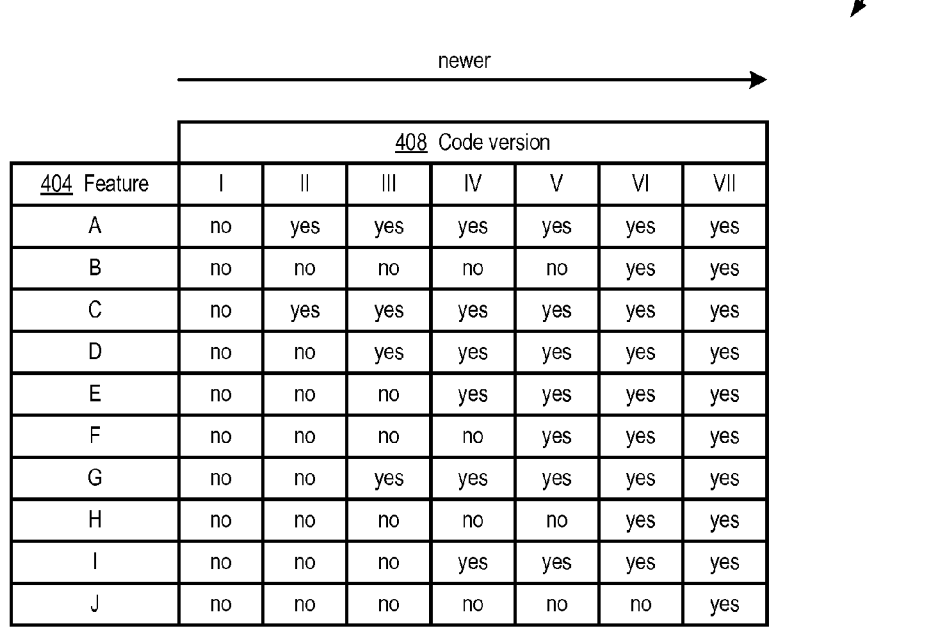
| | 408 Code version | | | | | | |
|---|---|---|---|---|---|---|---|
| 404 Feature | I | II | III | IV | V | VI | VII |
| A | no | yes | yes | yes | yes | yes | yes |
| B | no | no | no | no | no | yes | yes |
| C | no | yes | yes | yes | yes | yes | yes |
| D | no | no | yes | yes | yes | yes | yes |
| E | no | no | no | yes | yes | yes | yes |
| F | no | no | no | no | yes | yes | yes |
| G | no | no | yes | yes | yes | yes | yes |
| H | no | no | no | no | no | yes | yes |
| I | no | no | no | yes | yes | yes | yes |
| J | no | no | no | no | no | no | yes |
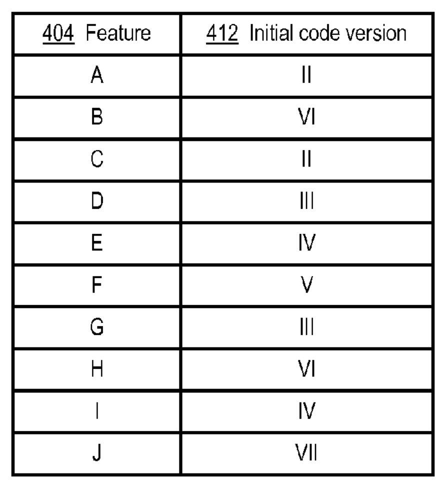
| 404 Feature | 412 Initial code version |
|---|---|
| A | II |
| B | VI |
| C | II |
| D | III |
| E | IV |
| F | V |
| G | III |
| H | VI |
| I | IV |
| J | VII |

Fig. 4c In-use scoreboard

344

| 404 Feature | 416 Currently In-use |
|---|---|
| A | |
| B | X |
| C | |
| D | |
| E | |
| F | X |
| G | X |
| H | X |
| I | |
| J | X |

Fig. 4d In-use scoreboard

344

| 404 Feature | 416 Currently In-use | 420 Hardware dependency | 424 Warning override |
|---|---|---|---|
| A | | no | |
| B | X | no | no |
| C | | no | |
| D | | no | |
| E | | no | |
| F | X | yes | |
| G | X | no | yes |
| H | X | no | yes |
| I | | yes | |
| J | X | no | no |

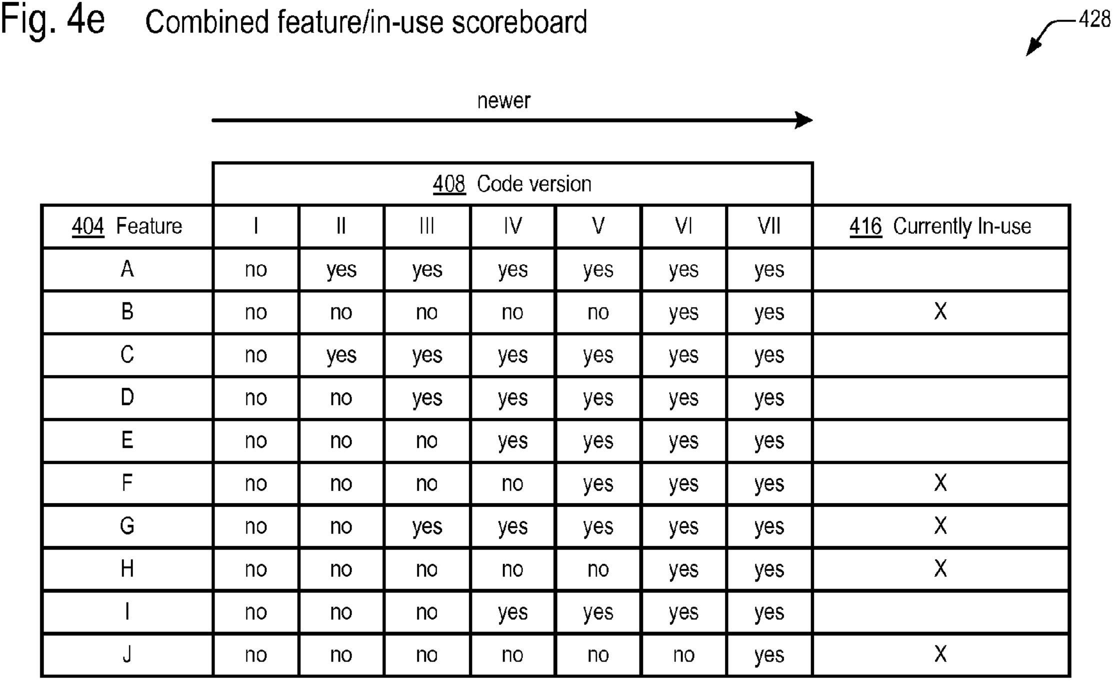

Fig. 4e Combined feature/in-use scoreboard

| 404 Feature | 408 Code version | | | | | | | 416 Currently In-use |
|---|---|---|---|---|---|---|---|---|
| | I | II | III | IV | V | VI | VII | |
| A | no | yes | yes | yes | yes | yes | yes | |
| B | no | no | no | no | no | yes | yes | X |
| C | no | yes | yes | yes | yes | yes | yes | |
| D | no | no | yes | yes | yes | yes | yes | |
| E | no | no | no | yes | yes | yes | yes | |
| F | no | no | no | no | yes | yes | yes | X |
| G | no | no | yes | yes | yes | yes | yes | X |
| H | no | no | no | no | no | yes | yes | X |
| I | no | no | no | yes | yes | yes | yes | |
| J | no | no | no | no | no | no | yes | X |

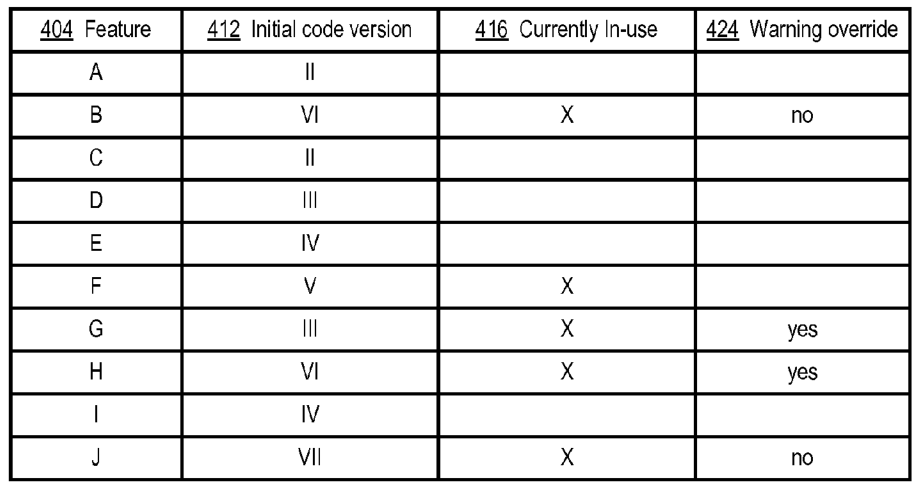

Fig. 4f Combined feature/in-use scoreboard

| 404 Feature | 412 Initial code version | 416 Currently In-use | 424 Warning override |
|---|---|---|---|
| A | II | | |
| B | VI | X | no |
| C | II | | |
| D | III | | |
| E | IV | | |
| F | V | X | |
| G | III | X | yes |
| H | VI | X | yes |
| I | IV | | |
| J | VII | X | no |

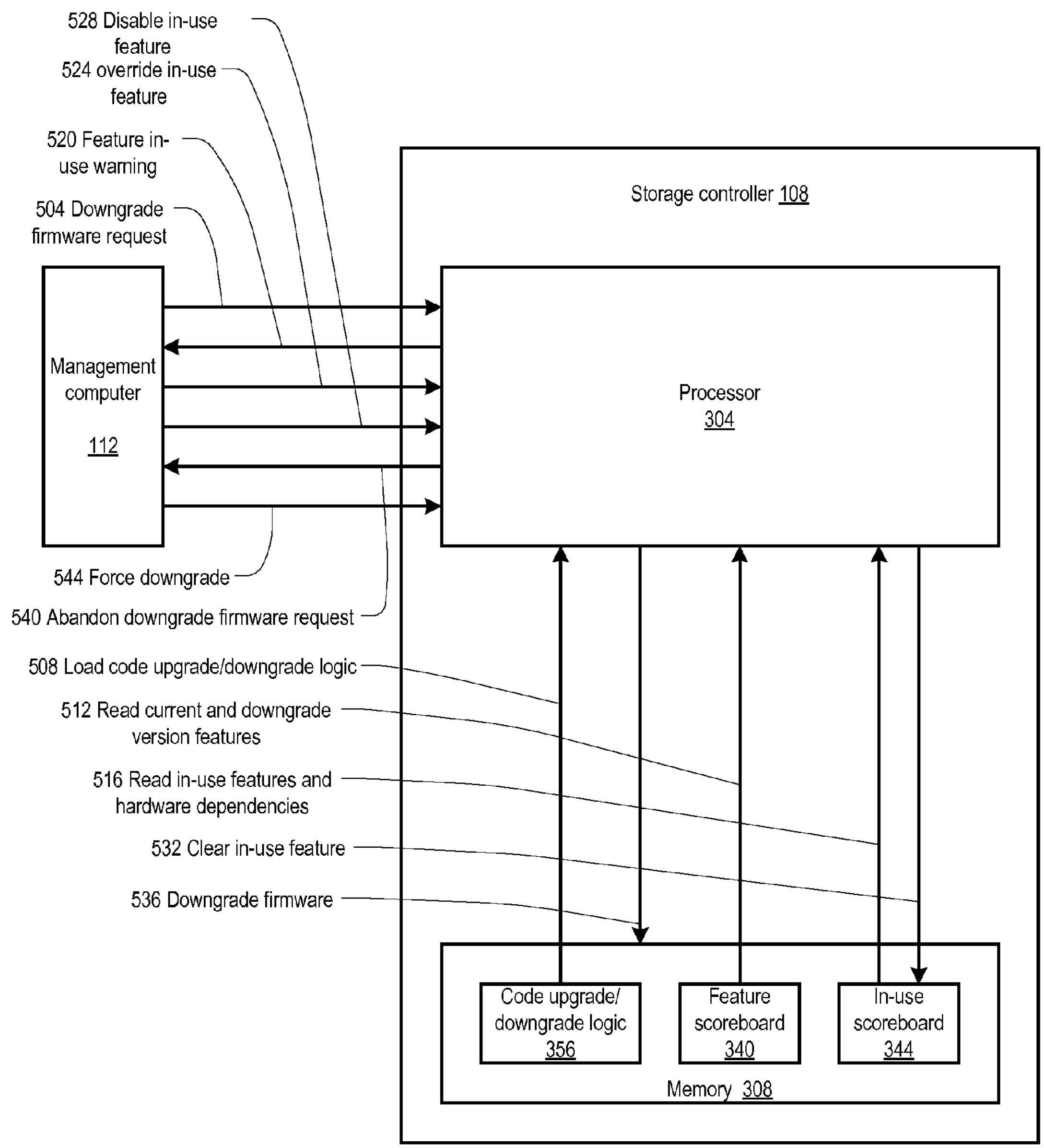
Fig. 5
528 Disable in-use feature
524 override in-use feature
520 Feature in-use warning
504 Downgrade firmware request
Storage controller 108
Management computer 112
Processor 304
544 Force downgrade
540 Abandon downgrade firmware request
508 Load code upgrade/downgrade logic
512 Read current and downgrade version features
516 Read in-use features and hardware dependencies
532 Clear in-use feature
536 Downgrade firmware
Code upgrade/ downgrade logic 356
Feature scoreboard 340
In-use scoreboard 344
Memory 308

Fig. 6a Enable feature process
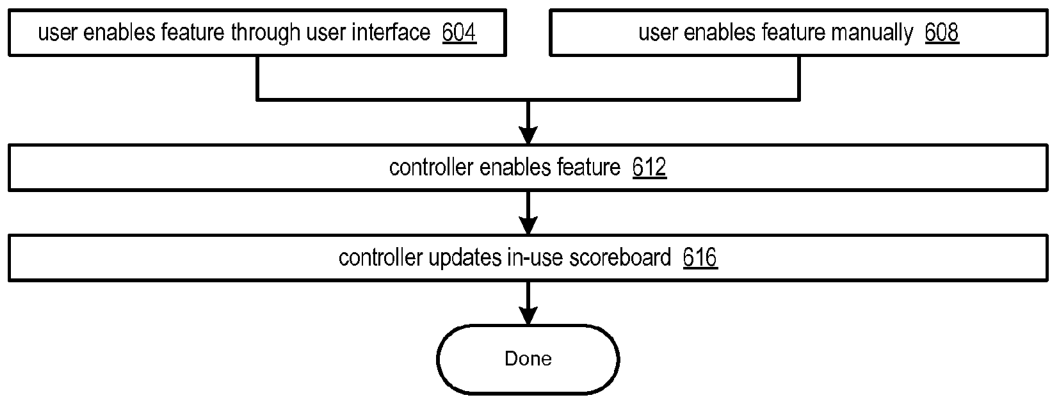
Fig. 6b disable feature process
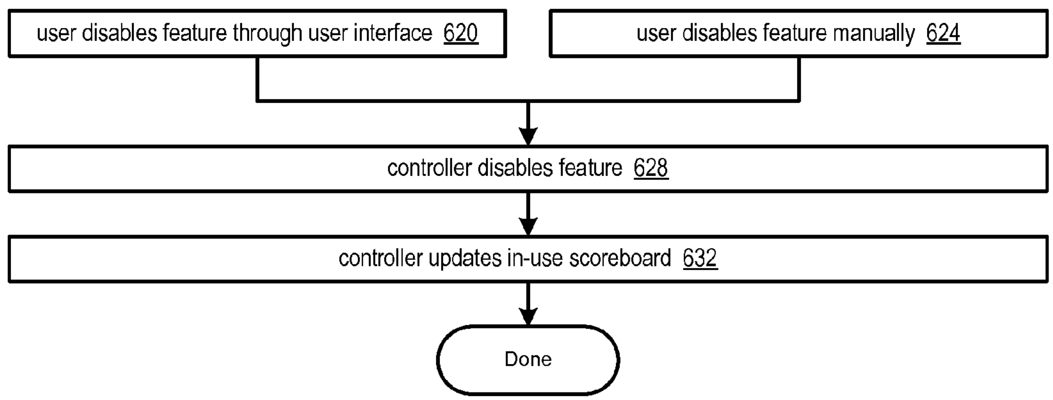

Fig. 7 Code downgrade process
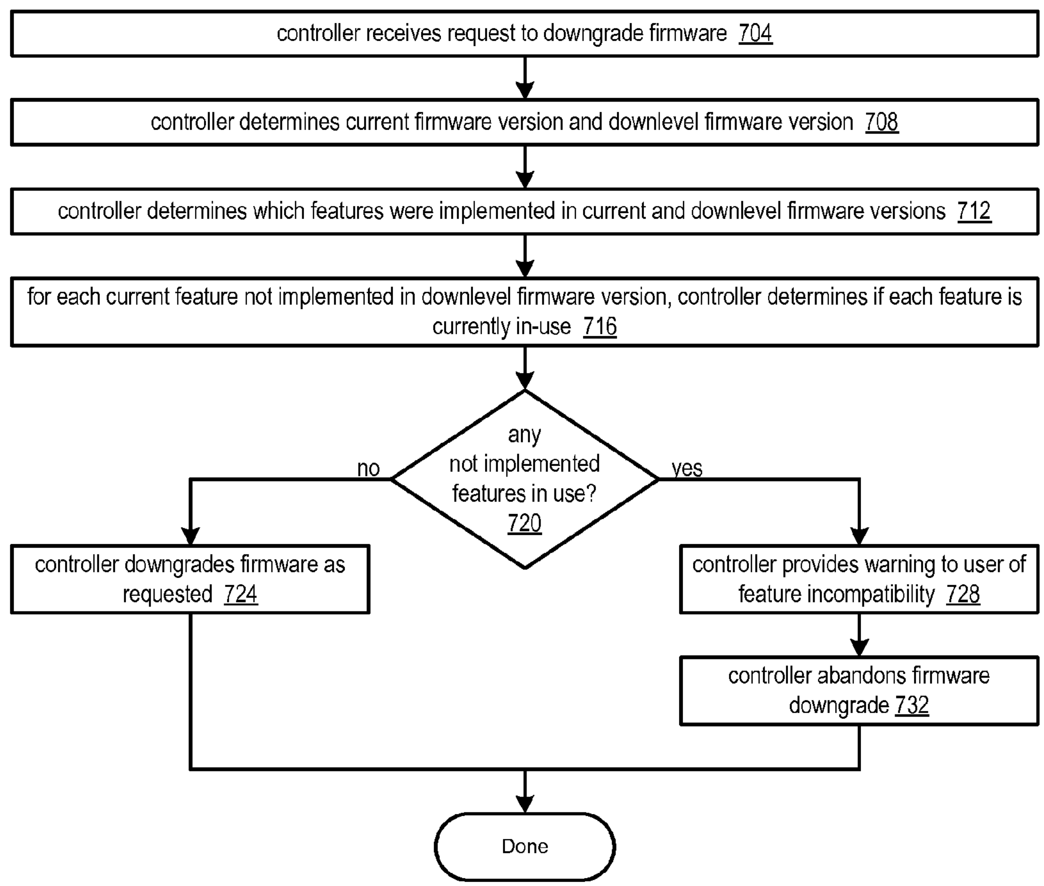

Fig. 8 Code downgrade process with overridden features
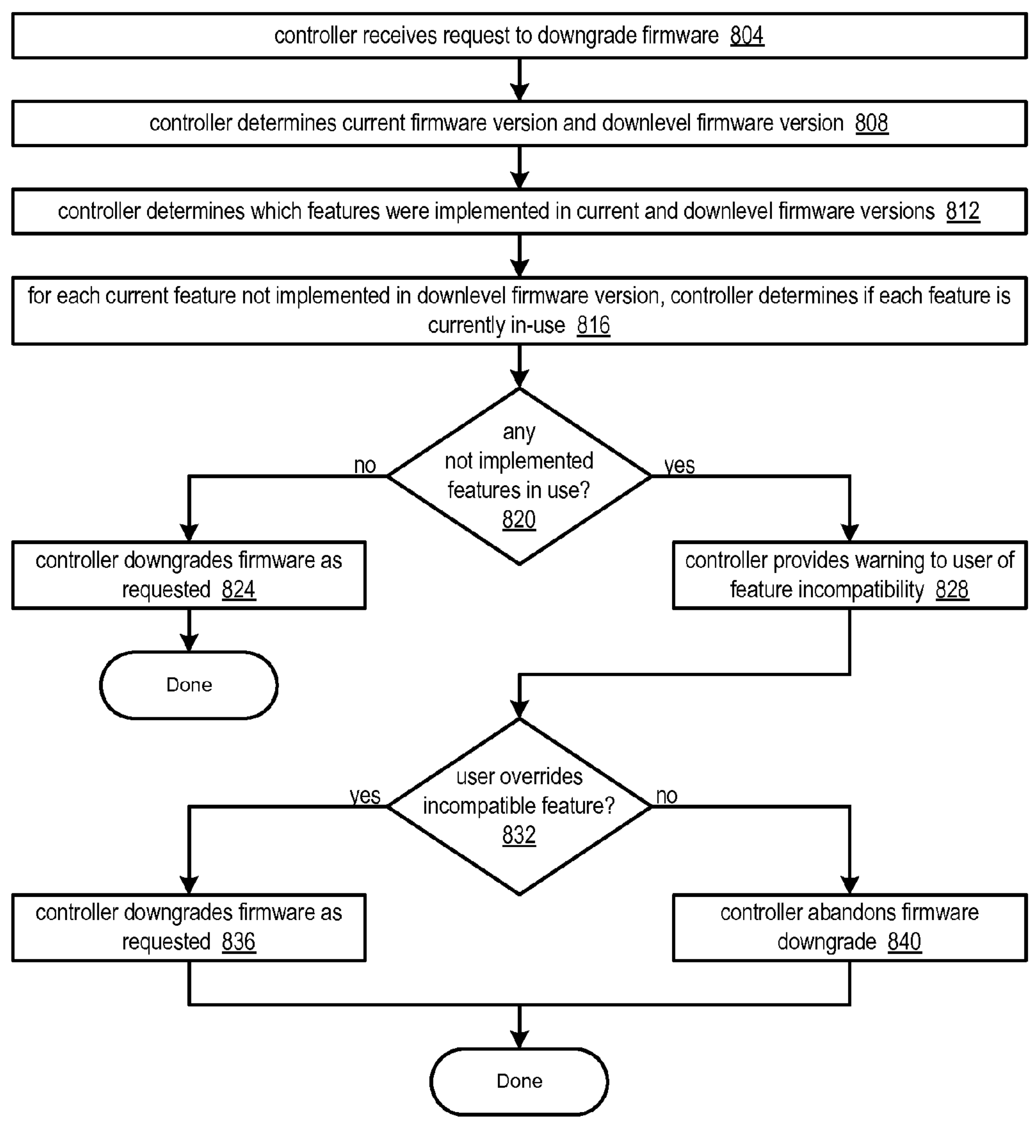

Fig. 9 Code downgrade process with disabled features
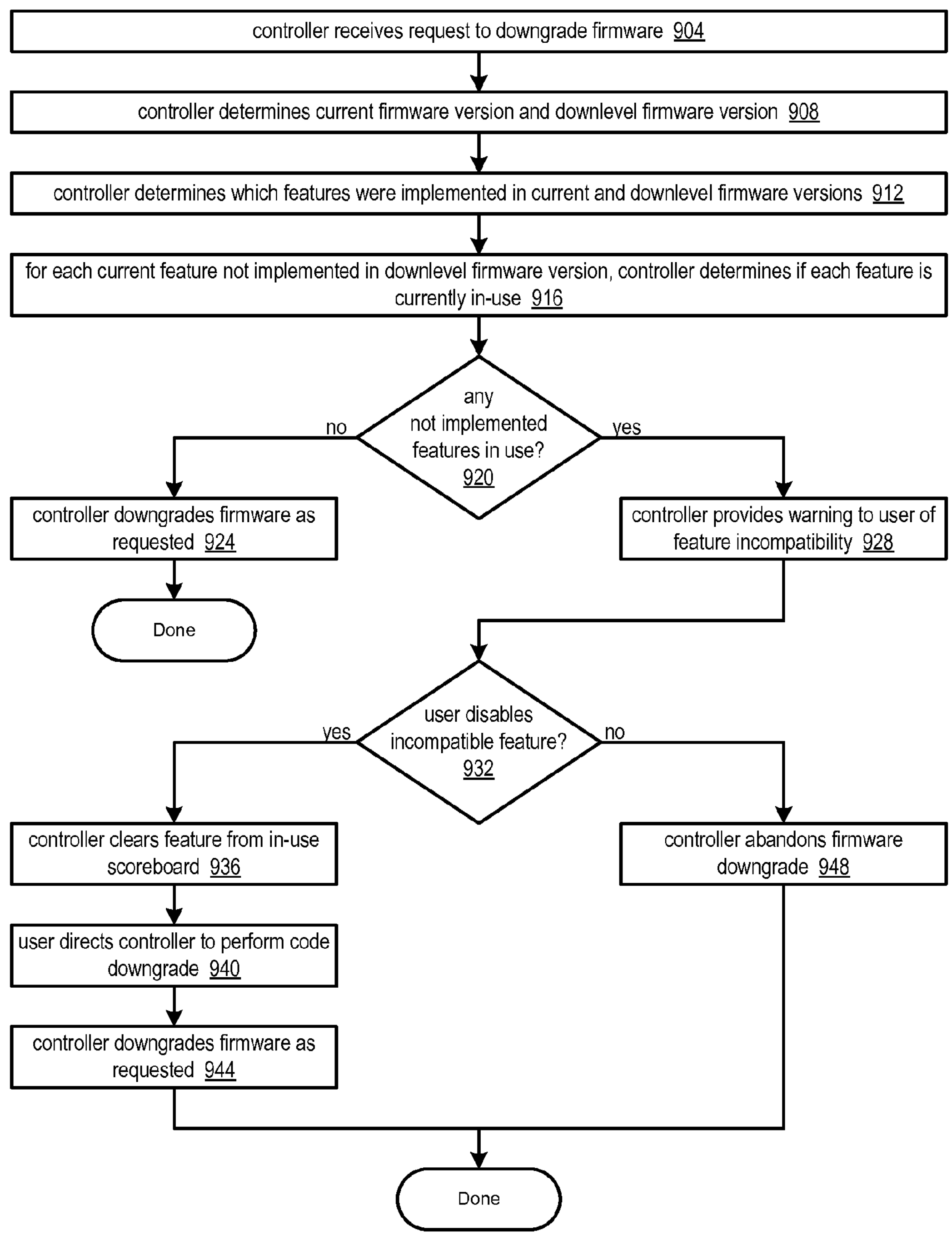

Fig. 10 Code downgrade process with disabled features and hardware dependency
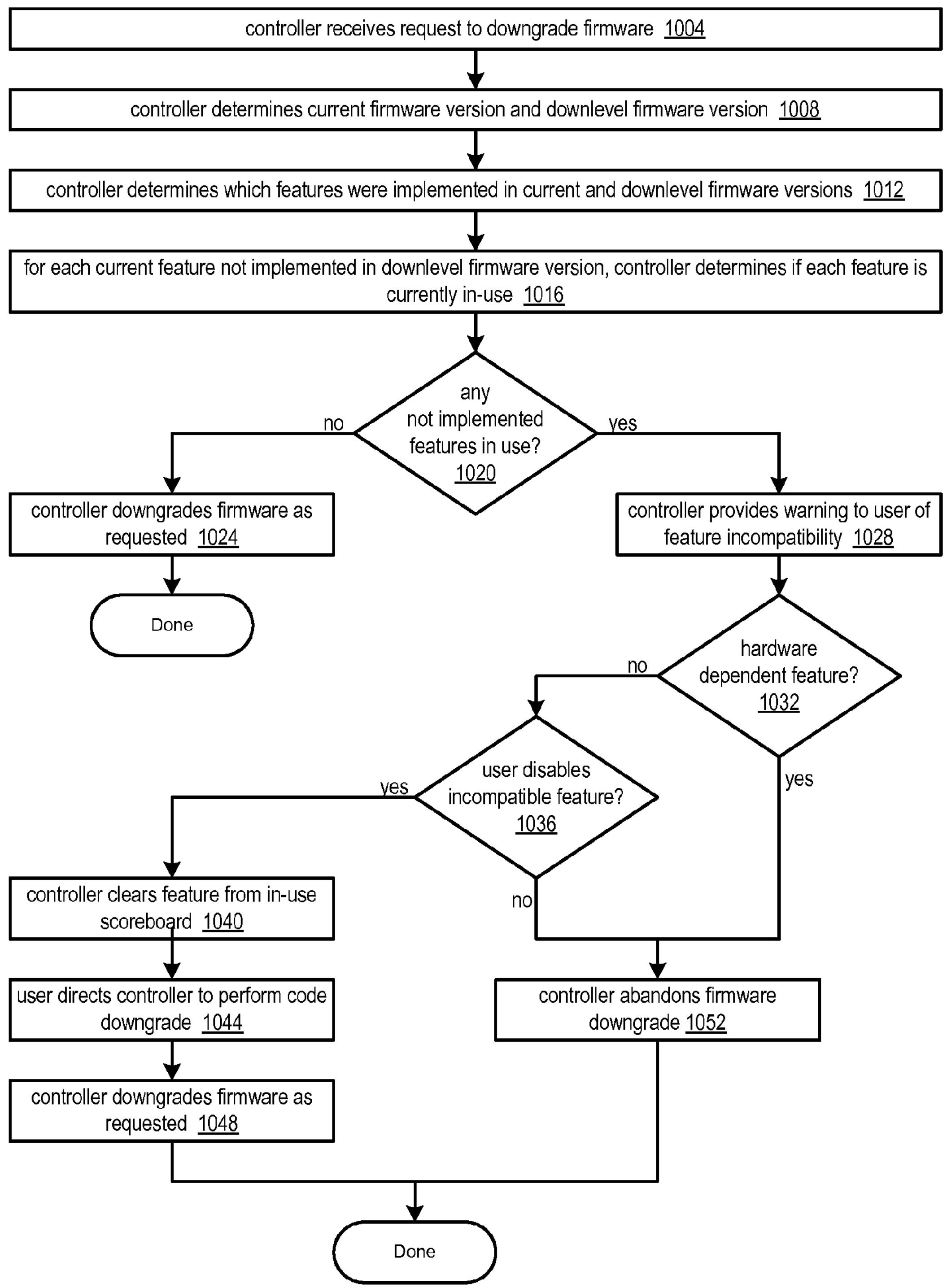

METHOD AND APPARATUS FOR DOWNGRADING FIRMWARE IN A CONTROLLER

FIELD

The present invention is directed to software version control. In particular, the present invention is directed to methods and apparatuses for downgrading controller firmware from a current version to an older version.

BACKGROUND

Computer-based systems require firmware (code) to provide operating programs for processors to execute. Operating programs often consist of several parts, including an operating system, a loader, diagnostics, utilities, and one or more applications. Many computer-based systems provide a means to change firmware in the field. Firmware upgrades are commonly utilized to provide newer firmware versions with fixes to firmware bugs and/or additional features and functionality. Upgrades help to prevent system obsolescence and therefore maintain system longevity.

Occasionally, a newer firmware version is not preferable to an older firmware version. Sometimes, a newer firmware version introduces bugs that were not present in an older firmware version. Other times, features present in a new version of firmware are not compatible with specific hardware of the computer-based system. In both cases, the system may experience a failure even though a newer version of firmware was installed. Therefore, it would be desirable to downgrade the firmware to a more stable older version rather than continue with the newer version and associated problems.

SUMMARY

The present invention is directed to solving disadvantages of the prior art. In accordance with embodiments of the present invention, a method for downgrading firmware in a controller is provided. The method includes receiving a request, by the controller, to downgrade the firmware from a current version to an older version. For a feature implemented in the current version and not implemented in the older version, the method includes determining if the feature is currently in-use by the controller. If the feature is currently in-use by the controller, the method includes providing a warning to a user and abandoning the request. If the feature is not currently in-use by the controller, the method includes checking other features implemented in the current version and not implemented in the older version and repeating determining, providing, abandoning, and checking, and downgrading the firmware, if all of the features implemented in the current version and not implemented in the older version are not currently in-use by the controller.

In accordance with embodiments of the present invention, a controller including firmware that can be downgraded from a current version to an older version is provided. The controller includes a processor and an interface, coupled to the processor. The interface provides control and status interaction with a user. The interface receives a request to downgrade the firmware from a current version to the older version. In response to the interface receives the request, for a feature implemented in the current version and not implemented in the older version, the processor determines if the feature is currently in-use by the controller. If the feature is currently in-use by the controller, the processor provides a warning to the user through the interface and abandons the request. If the feature is not currently in-use by the controller, the processor checks other features implemented in the current version and not implemented in the older version and repeats determines, provides, abandons, and checks, and the processor downgrades the firmware if all of the features implemented in the current version and not implemented in the older version are not currently in-use by the controller.

In accordance with other embodiments of the present invention, a method for selectively downgrading firmware in a controller is provided. The method includes receiving a request, by the controller, to downgrade the firmware from a current version to an older version. For each feature implemented in the current version and not implemented in the older version, the method includes determining if the feature is currently in-use by the controller. If the feature is currently in-use by the controller, the method includes providing a warning to a user and abandoning the request. If the feature is not currently in-use by the controller, the method includes downgrading the firmware, if all of the features implemented in the current version and not implemented in the older version are not currently in-use by the controller. After providing the warning to the user, the method includes the user disabling the feature and providing an indication to the controller that the feature is disabled. In response to receiving the indication, the method includes clearing the feature from an in-use scoreboard in a memory of the controller. Features not currently in-use by the controller are cleared from the in-use scoreboard.

An advantage of the present invention is that it provides a method for reliably downgrading controller firmware from a current version to an older version. By maintaining feature compatibility information for each version, the present invention is able to determine in advance if problems will result from downgrading firmware to an older version.

Another advantage of the present invention is that it takes into account whether a feature is currently in-use by the current firmware version and not used in the older firmware version. Warnings are provided to a user, who may either override the warning and proceed with the firmware downgrade, or disable the feature so the older firmware version will run reliably after the downgrade.

Yet another advantage of the present invention is it provides an important check for hardware compatibility prior to firmware downgrade, so that a user will be notified if the hardware compatibility prevents any in-use features from being disabled.

Additional features and advantages of embodiments of the present invention will become more readily apparent from the following description, particularly when taken together with the accompanying drawings.

BRIEF DESCRIPTION OF THE DRAWINGS

FIG. 2*a* is a block diagram illustrating a normal code upgrade operation in accordance with the present invention.

FIG. 2*b* is a block diagram illustrating a normal code downgrade operation in accordance with the present invention.

FIG. 2*c* is a block diagram illustrating a version-blocked code downgrade operation in accordance with the present invention.

FIG. 2*d* is a block diagram illustrating a modified code downgrade operation in accordance with the present invention.

FIG. 4*a* is a block diagram illustrating a first embodiment of a feature scoreboard in accordance with the present invention.

FIG. 4*b* is a block diagram illustrating a second embodiment of a feature scoreboard in accordance with the present invention.

FIG. 4*c* is a block diagram illustrating a first embodiment of an in-use scoreboard in accordance with the present invention.

FIG. 4*d* is a block diagram illustrating a second embodiment of an in-use scoreboard in accordance with the present invention.

FIG. 4*e* is a block diagram illustrating a first embodiment of a combined feature/in-use scoreboard in accordance with the present invention.

FIG. 4*f* is a block diagram illustrating a second embodiment of a combined feature/in-use scoreboard in accordance with the present invention.

FIG. 5 is a block diagram illustrating the principal action sequence between a management computer and a storage controller in accordance with the present invention.

FIG. 6*a* is a flowchart illustrating an enable feature process in accordance with embodiments of the present invention.

FIG. 6*b* is a flowchart illustrating a disable feature process in accordance with embodiments of the present invention.

FIG. 7 is a flowchart illustrating a code downgrade process in accordance with embodiments of the present invention.

FIG. 8 is a flowchart illustrating a code downgrade process with overridden features in accordance with embodiments of the present invention.

FIG. 9 is a flowchart illustrating a code downgrade process with disabled features in accordance with embodiments of the present invention.

FIG. 10 is a flowchart illustrating a code downgrade process with disabled features and hardware dependency in accordance with embodiments of the present invention.

DETAILED DESCRIPTION

The present invention is directed to the problem of reliably downgrading firmware in a computer memory system. A computer memory system of the present invention is characterized as having a processor that executes stored programs, and a means to upgrade or downgrade the stored programs in the field. One such computer memory system is the memory system of a storage controller in a data storage system. The terms "code" and "firmware" are used interchangeably herein to denote stored programs.

Figure 1A:
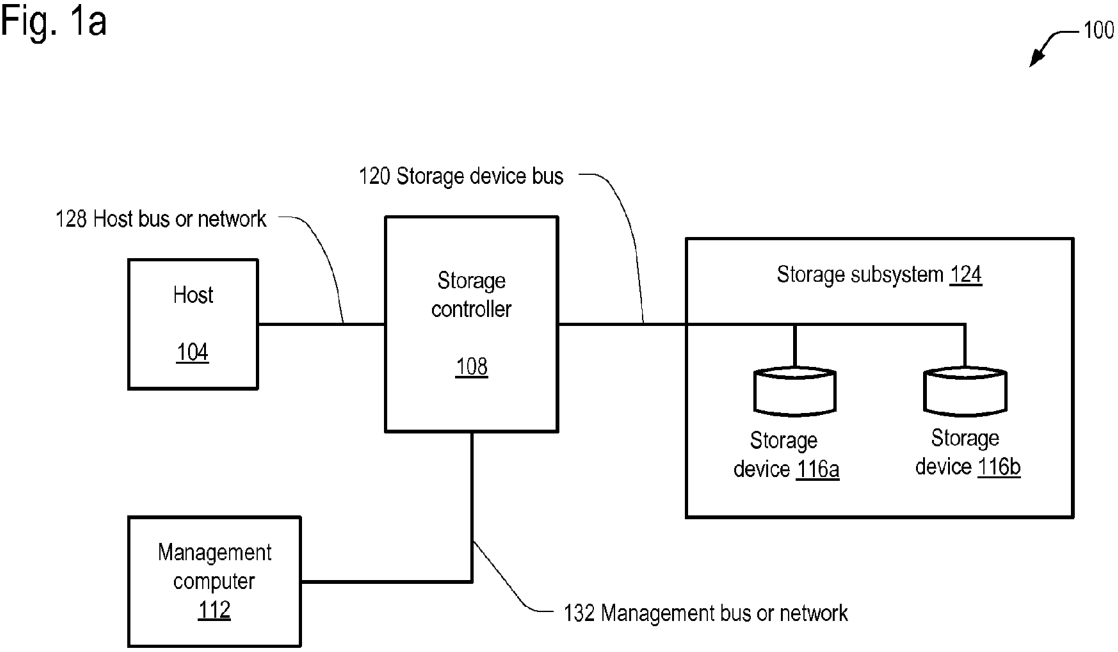
FIG. 1*a* is a block diagram illustrating components of a first data storage network in accordance with embodiments of the present invention.

Referring now to FIG. 1 a, a block diagram illustrating components of a first data storage network 100 in accordance with embodiments of the present invention is shown. The first data storage network 100 includes a storage controller 108, which controls transfer of data between one or more host computers 104 and one or more storage devices 116. The embodiment illustrated in the first data storage network 100 includes a single host computer 104 and a single storage system 124, although it should be understood that any number of host computers 104 or storage subsystems 124 may be present.

Host computers 104 include any computing device that generates data storage requests to storage devices 116, such as servers, desktop computers, portable computers, PDAs, tablet computers, or smart phones. Host computers 104 are coupled to storage controller 108 through a host bus or network 128. Host bus or network 128 includes any bus or network suitable for high-speed bidirectional data transfers. Examples of host bus or network 128 include, but are not limited to IP-based networks and SCSI-based networks. Examples of IP-based networks include, but are not limited to Ethernet, iSCSI, and ATM connections. Examples of SCSI-based buses and networks include, but are not limited to parallel SCSI, Fiber Channel, SAS, SSA, and SATA.

Storage system 124 is coupled to storage controller 108 by storage device bus 120. Storage device bus 120 is any suitable bus that provides data interconnection to one or more storage devices 116. Storage devices 116 include hard disk drives, tape drives, optical drives, and solid state disks. Storage controller 108 may have a single storage device bus 120, or multiple storage device buses 120.

First data storage system 100 also includes one or more management computers 112. Management computer 112 configures and monitors the operation of storage controller 108, by management bus or network 132. Management bus or network 132 is usually, but not necessarily, an IP network connection. In some embodiments, management computer 112 is a host computer 104 and is coupled to storage controller 108 by host bus or network 128. In other embodiments, storage controller 108 is an adapter board or FRU within host computer 104. In other embodiments, host computer 104 includes one or more storage controllers 108 and a storage subsystem 124.

Figure 1B:
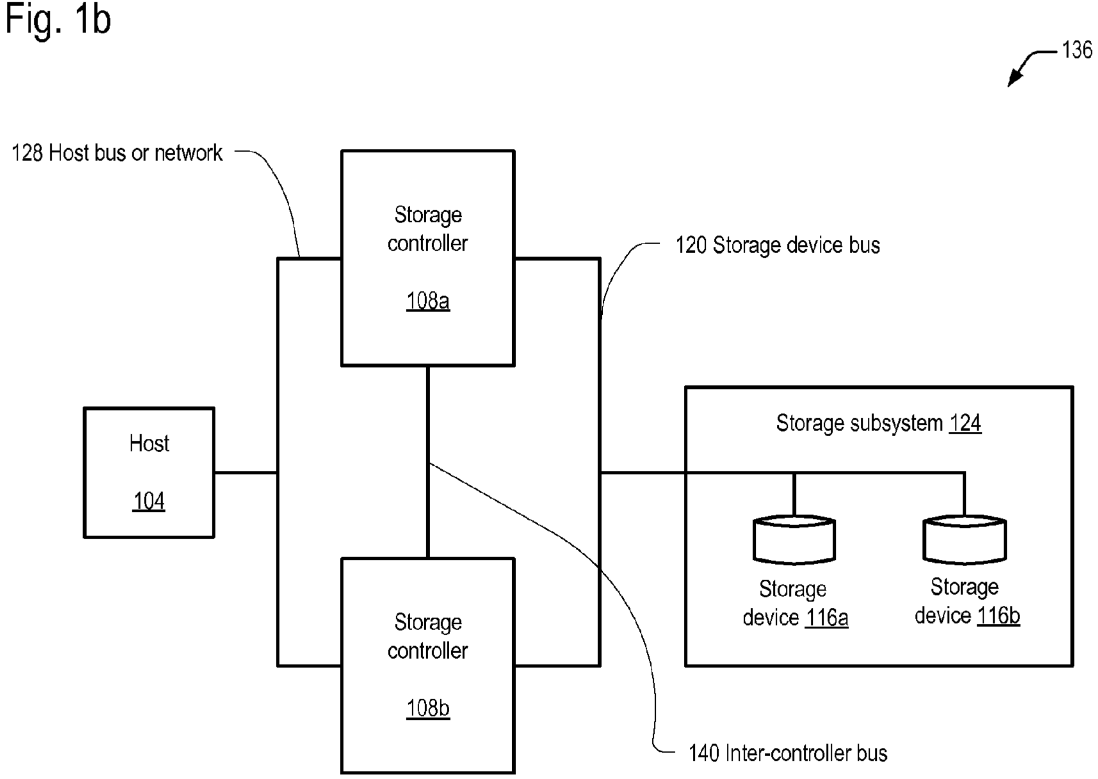
FIG. 1*b* is a block diagram illustrating components of a second data storage network in accordance with embodiments of the present invention.

Referring now to FIG. 1*b*, a block diagram illustrating components of a second data storage network 136 in accordance with embodiments of the present invention is shown. The second data storage network 136 includes the elements illustrated in the first data storage network 100, with the exception of the storage controller 108 function implemented as a pair of redundant storage controllers 108*a*, 108*b*. This arrangement is commonly used in redundant storage systems, where storage controllers are active-active RAID controllers. Storage controllers 108*a*, 108*b* are interconnected by inter-controller bus 140, which provides a local command path and mirroring interface for cached write data received from host computers 104. Although not illustrated in the second data storage system 136, it should be understood that one or more management computers 112 are present, and may be interconnected to storage controllers 108*a*, 108*b* through any of the arrangements described with reference to first data storage network 100.

Referring now to FIG. 2*a*, a block diagram illustrating a normal code upgrade operation 200 in accordance with the present invention is shown. The normal upgrade process is a single step process, where a new code version 208 is loaded into storage controller 108 over the top of an old code version 204. Once the new code version 208 is loaded, the storage controller 108 operates with the new code version 208.

Referring now to FIG. 2*b*, a block diagram illustrating a normal code downgrade operation 212 in accordance with the present invention is shown. The normal code downgrade operation a single step process, where the old code version 204 is loaded into storage controller 108 over the top of the new code version 208. Once the old code version 204 is loaded, the storage controller 108 operates with the old code version 204.

Referring now to FIG. 2*c*, a block diagram illustrating a version-blocked code downgrade operation 220 in accordance with the present invention is shown. New code version 208 includes code downgrade blocking logic 224. In one embodiment, code downgrade blocking logic 224 blocks any code downgrade process, and prevents old code version 204 from being loaded. In another embodiment, code downgrade blocking logic 224 blocks code downgrades from new code version 208 to the old code version 204 if the old code version 204 is not identified in the code downgrade blocking logic 224 as an allowed code downgrade version. Such a feature is helpful if one or more old code versions 204 have been determined to not run reliably on storage controller 108. In that case, code downgrade blocking logic 224 will only allow predetermined code downgrades to known reliable old code versions 204. However, the version-blocked code downgrade process does not allow for finer granularity than code versions to be considered in the code downgrade process, including which features are implemented in specific old code versions 204 or hardware dependencies associated with old code versions 204.

Referring now to FIG. 2*d*, a block diagram illustrating a modified code downgrade operation 228 in accordance with the present invention is shown. The modified code downgrade process includes the new code version 208, which includes code downgrade blocking logic 224 described in FIG. 2*c*. However, instead of downgrading directly from new code version 208 to old code version 204, the modified code downgrade process utilizes a two-step process. In the first step, the modified code downgrade process downgrades the new code version 208 to a new code deviation version 232. The new code deviation version 232 is identical to new code version 208, with the exception that the new code deviation version 232 does not include code downgrade blocking logic 224. Otherwise, new code deviation version 232 is the same as new code version 208. In the second step of the modified code downgrade process, the new code deviation version 232 is replaced with old code version 204. Since there is no code downgrade blocking logic 224 present in new code deviation version 232, there is no version checking and the old code version 204 is always loaded. As described in FIG. 2*c*, the modified code downgrade process does not allow for finer granularity than code versions to be considered in the code downgrade process, including which features are implemented in specific old code versions 204 or hardware dependencies associated with old code versions 204.

Figure 3:
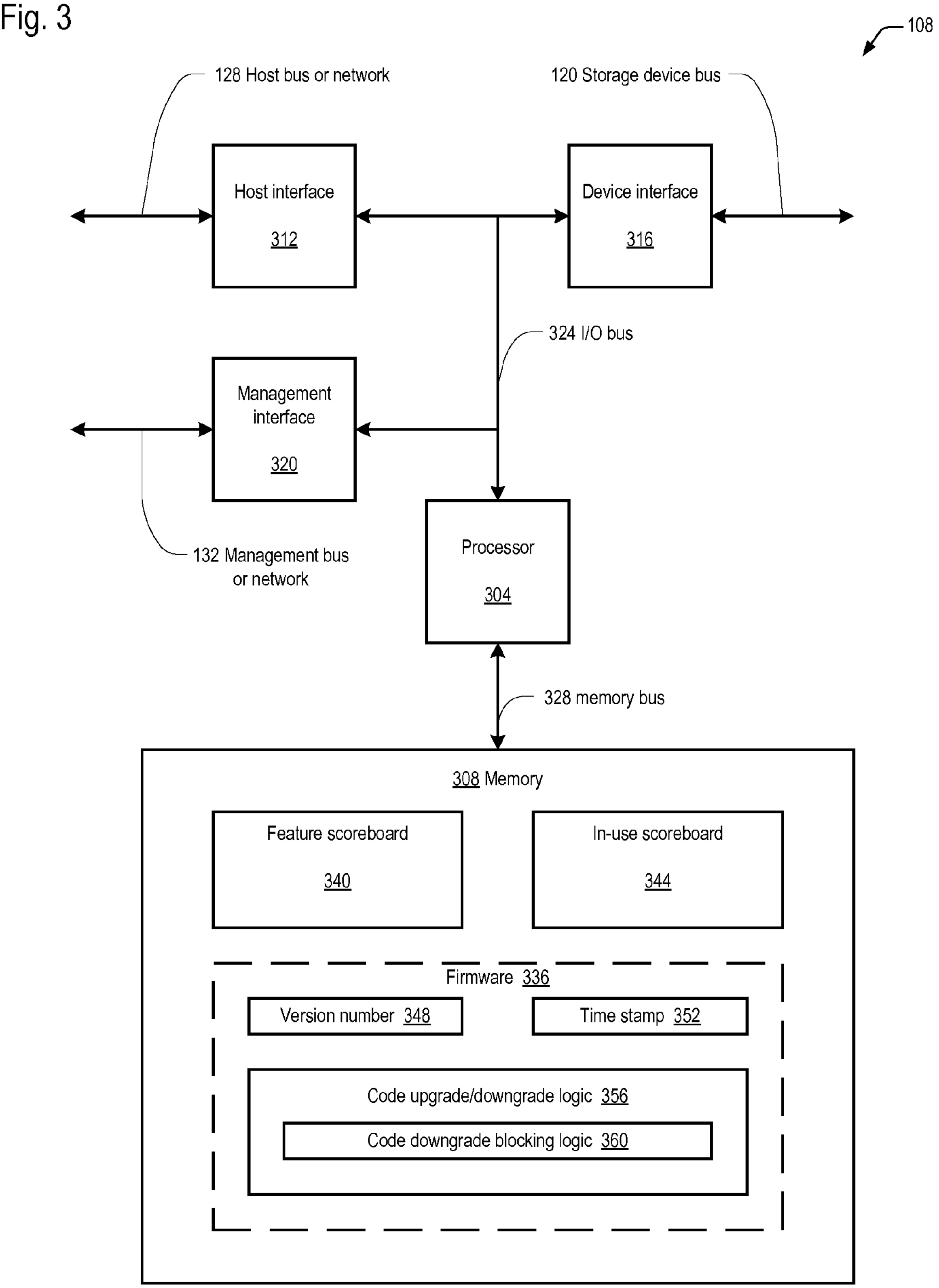
FIG. 3 is a block diagram illustrating components of a storage controller in accordance with embodiments of the present invention.

Referring now to FIG. 3, a block diagram illustrating components of a storage controller 108 in accordance with embodiments of the present invention is shown. Storage controller 108 includes a processor 304, which executes stored programs stored in a memory 308 of the storage controller 108. Processor 304 includes microprocessors, field programmable gate arrays (FPGAs), and hardware state machines. Memory 308 is coupled the processor 304 by memory bus 328, a high-speed bidirectional data path. Memory 308 may include volatile memory, nonvolatile memory, or any combination of the two. Memory 308 also includes both removable and non-removable memory.

Memory 308 stores one or more images of firmware 336. Multiple images of firmware 336 may include different versions of firmware 336, as well as multiple identical copies of the same version of firmware 336. In one embodiment, firmware 336 is identified by processor 304 by a version number 348 stored within firmware 336. In another embodiment, firmware 336 is identified by processor 304 by a time stamp 352. The time stamp 352 may denote the time firmware 336 was created, the time firmware 336 was loaded into memory 308, or some other time that differentiates firmware 336 from other firmware 336 images. Memory 308 also includes a feature scoreboard 340 and an in-use scoreboard 344. Details and embodiments of feature scoreboard 340 and in use scoreboard 344 are described in FIGS. 4*a* through 4*f*. Although FIG. 3 depicts feature scoreboard 340 and in use scoreboard 344 in the same memory 308 as firmware 336, it should be understood that any of the firmware 336, feature scoreboard 340, and in use scoreboard 344 may be stored in different and/or different types of memory 308.

Firmware 336 includes code upgrade/downgrade logic 356, which include instructions used by processor 304 to upgrade or downgrade code as described in FIGS. 2*a* through 2*d*. Code upgrade/downgrade logic 356 includes code downgrade blocking logic 360, which blocks code downgrade under certain conditions described in the following paragraphs.

One or more host interfaces 312 are coupled to processor 304 over I/O bus 324. Host interface 312 provides one or more connections to host computers 104 over host bus or network 128. I/O bus 324 is any local bus suitable for high-speed bidirectional data transfer, including PCI, PCI-X, RapidIO, or PCI express.

One or more device interfaces 316 are coupled the processor 304 over I/O bus 324. Device interface 316 provides one or more connections to storage devices 116 over one or more storage device buses 120.

Management interface 320 is coupled to processor 304 over I/O bus 324 management interface 320 provides one or more connections to management computers 112 over management bus or network 132 in some embodiments, host interface 312 serves as management interface 320 and communicates with one or more host computers 104 configured as a management computer 112.

Referring now to FIG. 4*a*, a block diagram illustrating a first embodiment of a feature scoreboard 340 in accordance with the present invention is shown. Feature scoreboard 340 is a data table stored in memory 308, and identifies differentiable features in each code version. Differentiable features are those features that have the potential to provide firmware compatibility problems whether or not those features are present in the current code version. Feature scoreboard 340 includes identification of differentiable features 404, and are shown in FIG. 4*a* is feature A through feature J.

Feature scoreboard 340 also includes identification of code versions 408, and is shown in FIG. 4*a* as code version I through code version VII, where code versions with higher numbered versions 408 are newer than code versions with lower numbered versions 408. In the example of FIG. 4*a*, code version I includes none of features A through J, code version II includes features A and C, code version III includes features A, C, D, and G, code version IV includes features A, C-E, G, and I, code version V includes features A, C-G, and I, code version VI includes features A-I, and code version VII includes features A-J. It should be understood that code version 408 columns are added to the feature scoreboard 340 as new code versions 408 become available. In one embodiment, code version 408 includes only version number 348. In a second embodiment, code version 408 includes both version number 348 and time stamp 352. In a third embodiment, code version 408 includes only time stamp 352.

Referring now to FIG. 4*b*, a block diagram illustrating a second embodiment of a feature scoreboard 340 in accordance with the present invention is shown. The representation of the feature scoreboard 340 illustrated in FIG. 4*b* is a simplified version of the feature scoreboard 340 illustrated in FIG. 4*a*. Instead of explicitly listing the presence or absence of each differentiable feature 404 in each code version 408, feature scoreboard 340 of FIG. 4*b* replaces the code version 408 columns of FIG. 4*b* with a single initial code version 412 column in FIG. 4*b*. The initial code version column 412 specifies the initial code version a specific differentiable feature 404 appears in. The implication is that once a feature 404 is introduced in an initial code version 412, all code versions after the initial code version 412 would also have the feature 404 present. However, if a given feature 404 is present only for a limited number of code versions 408, and not present thereafter, the embodiment shown in FIG. 4*b* is not sufficient. In that case, the embodiment shown in FIG. 4*a* is preferable since it explicitly defines which features 404 are in each code version 408. In one embodiment, initial code version 412 includes only version number 348. In a second embodiment, initial code version 412 includes both version number 348 and time stamp 352. In a third embodiment, initial code version 412 includes only time stamp 352.

Referring now to FIG. 4*c*, a block diagram illustrating a first embodiment of an in-use scoreboard 344 in accordance with the present invention is shown. The in-use scoreboard 344 identifies which of the differentiable features 404 is currently in-use 416. In the example shown in FIG. 4*c*, only features B, F-H, and J are currently in-use. Features A, C-E, and I are not currently in-use. In one embodiment, currently in-use features 416 are licensed features that are currently in-use. Licensed features are added-value features for which an additional fee has been paid.

Referring now to FIG. 4*d*, a block diagram illustrating a second embodiment of an in-use scoreboard 344 in accordance with the present invention is shown. In the second embodiment of the in-use scoreboard 344, additional columns are present for hardware dependency 420 and warning override 424.

Hardware dependency 420 identifies if there is a specific hardware dependency associated with each feature 404 in the in-use scoreboard 344. For example, some features 404 may require a specific processor 304, and will not properly function if a specific processor 304 type is not present in the storage controller 108. In the example illustrated, features F and I have a hardware dependency; no other features have a hardware dependency. In another example, storage controller 108 includes a flash memory device as a non-volatile memory 308. If a later version of storage controller 108 uses a larger flash memory device, the configuration information stored in the larger flash memory device may not be understood by an older downgraded code version that only understands a smaller flash memory device size.

In-use scoreboard 344 of FIG. 4*d* also includes warning override 424. Warning override 424 identifies which features 404 a user has overridden a warning associated with the feature 404, and is described in more detail with reference to FIGS. 5 and 7-10.

In one embodiment, currently in-use features 416 are licensed features that are currently in-use. Licensed features are added-value features for which an additional fee has been paid.

Referring now to FIG. 4*e*, a block diagram illustrating a first embodiment of a combined feature/in-use scoreboard 428 in accordance with the present invention is shown. Combined feature/in use scoreboard 428 combines feature scoreboard 340 with in-use scoreboard 344. The embodiment illustrated in FIG. 4*e* combines the feature scoreboard of FIG. 4*a* with the in-use scoreboard of FIG. 4*c*. The sole advantage of the combined feature/in-use scoreboard 428 is somewhat less memory 308 usage due to a more compact format. It should be understood that many such other embodiments of a combined feature/in-use scoreboard 428 may be implemented in the context of the present invention. In one embodiment, code version 408 includes only version number 348. In a second embodiment, code version 408 includes both version number 348 and time stamp 352. In a third embodiment, code version 408 includes only time stamp 352.

Referring now to FIG. 4*f*, a block diagram illustrating a second embodiment of a combined feature/in-use scoreboard 432 in accordance with the present invention is shown. The combined feature/in-use scoreboard 432 combines the feature scoreboard 340 of FIG. 4*b* with the in-use scoreboard 344 of FIG. 4*d*. Combined feature/in-use scoreboard 432 has the same advantage as combined feature/in-use scoreboard 428. In one embodiment, initial code version 412 includes only version number 348. In a second embodiment, initial code version 412 includes both version number 348 and time stamp 352. In a third embodiment, initial code version 412 includes only time stamp 352.

Referring now to FIG. 5, a block diagram illustrating the principal action sequence between a management computer 112 and a storage controller 108 in accordance with the present invention is shown. Storage controller 108 includes a processor 304 and a memory 308, and the other elements illustrated in FIG. 3 are understood to be present and not shown for clarity.

The action sequence of the present invention is initiated by a downgrade firmware request 504 transferred from a management computer 112 to the storage controller 108. In response to receiving the downgrade firmware request 504, processor 304 loads code upgrade/downgrade logic 508 from code upgrade/downgrade logic 356 in memory 308. Code upgrade/downgrade logic 356 includes instructions for upgrading or downgrading firmware 336.

Processor 304 executes code upgrade/downgrade logic 356, which specifies that processor 304 reads the current and downgrade version features 512 from the feature scoreboard 340 (or a combined feature/in-use scoreboard as illustrated in FIG. 4*e* or 4*f*). Processor 304 also reads in-use features and hardware dependencies 516 (if present) from in-use scoreboard 344 (or a combined feature/in-use scoreboard as illustrated in FIG. 4*e* or 4*f*).

Once the processor 304 has read the features and in-use status, the processor 304 determines if a feature in-use warning 520 should be sent to the management computer 112. Feature in-use warnings 520 indicate to a user of management computer 112 that a differentiable feature 404 not present in the older firmware version (identified in the downgrade firmware request 504) is currently in-use by the current firmware 336 in storage controller 108.

In one embodiment, the user prefers to override in-use features corresponding to the feature in-use warning 520, and management computer 112 transfers override in-use feature 524 to storage controller 108. In another embodiment, the user prefers to disable in-use features corresponding to a feature in-use warning 520, and management computer 112 transfers disable in-use feature 528 to storage controller 108. In some embodiments, the user is able to selectively override or disable individual in-use features, as desired. When the user overrides a feature in-use warning 520, the management computer 112 generates force firmware downgrade 544 to the controller 108, and the controller 108 in response downgrades the firmware 536, as commanded. When the user elects to not override a feature in use warning 520, the controller 108 abandons the firmware downgrade request 540.

If the storage controller 108 receives disable in-use feature 528 from the management computer 112, the processor 304 clears the in-use feature 532 designated by the disable in-use feature 528. Clear in-use feature 532 clears the designated feature 404 from the in-use scoreboard 344 in memory 308. Once all the features designated by disable in-use feature 528 have been cleared 532 from the in-use scoreboard 344, the processor 304 downgrades the firmware 536 to the version of firmware designated by the downgrade firmware request 504.

In one embodiment, the downgrade firmware 336 is already in memory 308 of the storage controller 108. In a second embodiment, the downgrade firmware 336 is stored on one or more storage devices 116 controlled by storage controller 108. In a third embodiment, the downgrade firmware 336 is downloaded by the storage controller 108 from the management computer 112 or a host computer 104.

Referring now to FIG. 6*a*, a flowchart illustrating an enable feature process in accordance with embodiments of the present invention is shown. Flow begins at blocks 604 and 608.

At block 604, a user enables a feature 404 through a user interface. The user interface is associated with the management computer 112, whether the management computer 112 is a standalone computer or implemented in a host computer 104. Flow proceeds to block 612

At block 608, a user enables a feature 404 manually. A manually enabled feature is a feature 404 enabled at the storage controller 108, and not through a user interface. An example of a manually enabled feature is connecting (or reconnecting) an existing RAID 6 storage subsystem 124 to the storage controller 108. Manually enabled features are automatically detected by the storage controller 108. Flow proceeds to block 612.

At block 612, the storage controller 108 enables the feature 404. Flow proceeds to block 616.

At block 616, the storage controller 108 updates the in-use scoreboard 344 to reflect the feature 404 now enabled by the storage controller 108. Flow ends at block 616.

Referring now to FIG. 6*b*, a flowchart illustrating a disable feature process in accordance with embodiments of the present invention is shown. Flow begins at blocks 620 and 624.

At block 620, a user disables a feature 404 through a user interface. The user interface is associated with the management computer 112, whether the management computer 112 is a standalone computer or implemented in a host computer 104. Flow proceeds to block 628.

At block 624, a user disables a feature 404 manually. A manually disabled feature is a feature 404 disabled at the storage controller 108, and not through a user interface. An example of a manually disabled feature is disconnecting an existing RAID 6 storage subsystem 124 from the storage controller 108. Manually disabled features are automatically detected by the storage controller 108. Flow proceeds to block 628.

At block 628, the storage controller 108 disables the feature 404. Flow proceeds to block 632.

At block 632, the storage controller 108 updates the in-use scoreboard 344 to reflect the feature 404 now disabled by the storage controller 108. Flow ends at block 632.

Referring now to FIG. 7, a flowchart illustrating a code downgrade process in accordance with embodiments of the present invention is shown. Flow begins at block 704.

At block 704, the storage controller 108 receives a downgrade firmware request 504. The downgrade firmware version 408 may be immediately previous firmware version 408, or an older firmware version 408. Flow proceeds to block 708.

At block 708, the storage controller 108 determines the current firmware version 408 and the down level firmware version 408. In one embodiment, the processor 304 reads the version number 348 of firmware 336 to determine the firmware version 408. In a second embodiment, the processor 304 reads a time stamp 352 of firmware 336 to determine the firmware version 408. In a third embodiment, the processor 304 reads both the version number 348 and a time stamp 352 of firmware 336 to determine the firmware version 408. In a fourth embodiment, a user provides an indication of firmware version 408 from the management computer 112. Flow proceeds to block 712.

At block 712, the storage controller 108 determines which features 404 were implemented in the current and down level firmware versions 408. The processor 304 reads the feature scoreboard 340 in order to determine which features 404 are in the current and downgrade firmware versions 408. Flow proceeds to block 716.

At block 716, for each current feature not implemented in the down level firmware version 408 the storage controller 108 determines if each feature 404 is currently in-use. The processor 304 reads the in-use scoreboard 344 to determine currently in-use features 404. Flow proceeds to decision block 720.

At decision block 720, the processor 304 determines if any not-implemented features in the downgrade firmware version 408 are currently in-use. If any not implemented features are not in-use, then flow proceeds to block 724. If any not implemented features are in-use then flow proceeds to block 728.

At block 724, the storage controller 108 downgrades the firmware 336 as requested in the downgrade firmware request 504. In one embodiment, the downgrade firmware 336 is already in memory 308, and the processor 304 loads the downgrade firmware 336. In a second embodiment, the downgrade firmware 336 is stored on one or more storage devices 116, and the processor 304 loads the downgrade firmware 336 from the storage devices 116. In a third embodiment, a user loads downgrade firmware 336 into memory 308 from a management computer 112. Flow ends at block 724.

At block 728, the storage controller 108 provides a warning 520 to a user of feature incompatibility between the current firmware version 408 and the downgrade firmware version 408. The warning 520 is provided as an indication through a user interface of a management computer 112. Flow proceeds to block 732.

At block 732, the storage controller 108 abandons the firmware downgrade, and provides notification of the abandoned firmware downgrade 540 to the user. Flow ends at block 732.

Referring now to FIG. 8, a flowchart illustrating a code downgrade process with overridden features in accordance with embodiments of the present invention is shown. Flow begins at block 804.

At block 804, the storage controller 108 receives a downgrade firmware request 504. The downgrade firmware version 408 may be immediately previous firmware version 408, or an older firmware version 408. Flow proceeds to block 808.

At block 808, the storage controller 108 determines the current firmware version 408 and the down level firmware version 408. In one embodiment, the processor 304 reads the version number 348 of firmware 336 to determine the firmware version 408. In a second embodiment, the processor 304 reads a time stamp 352 of firmware 336 to determine the firmware version 408. In a third embodiment, the processor 304 reads both the version number 348 and a time stamp 352 of firmware 336 to determine the firmware version 408. In a fourth embodiment, a user provides an indication of firmware version 408 from the management computer 112. Flow proceeds to block 812.

At block 812, the storage controller 108 determines which features 404 were implemented in the current and down level firmware versions 408. The processor 304 reads the feature scoreboard 340 in order to determine which features 404 are in the current and downgrade firmware versions 408. Flow proceeds to block 816.

At block 816, for each current feature 404 not implemented in the down level firmware version 408, the storage controller 108 determines if each feature 404 is currently in-use. The processor 304 reads the in-use scoreboard 344 to determine currently in-use features 404. Flow proceeds to decision block 820.

At decision block 820, the processor 304 determines if any not-implemented features in the downgrade firmware version 408 are currently in-use. If any not implemented features are not in-use, then flow proceeds to block 824. If any not implemented features are in-use then flow proceeds to block 828.

At block 824, the storage controller 108 downgrades the firmware 336 as requested in the downgrade firmware request 504. In one embodiment, the downgrade firmware 336 is already in memory 308, and the processor 304 loads the downgrade firmware 336. In a second embodiment, the downgrade firmware 336 is stored on one or more storage devices 116, and the processor 304 loads the downgrade firmware 336 from the storage devices 116. In a third embodiment, a user loads downgrade firmware 336 into memory 308 from a management computer 112. Flow ends at block 824.

At block 828, the storage controller 108 provides a warning 520 to a user of feature incompatibility between the current firmware version 408 and the downgrade firmware version 408. The warning 520 is provided as an indication through a user interface of a management computer 112. Flow proceeds to decision block 832.

At decision block 832, the user chooses whether to override an incompatible feature 404 between the current firmware version 408 and the down level firmware version 408. If the user does not override the incompatible feature 404, then flow proceeds to block 840. If the user does override the incompatible feature 404, then flow proceeds to block 836.

At block 836, the storage controller 108 downgrades the firmware 336 as requested in the downgrade firmware request 504. In one embodiment, the down level firmware 336 is already in memory 308, and the processor 304 loads the down level firmware 336. In a second embodiment, the down level firmware 336 is stored on one or more storage devices 116, and the processor 304 loads the down level firmware 336 from the storage devices 116. In a third embodiment, a user loads down level firmware 336 into memory 308 from a management computer 112. Flow ends at block 836.

At block 840, the storage controller 108 abandons the firmware downgrade. The user provides an indication 540 through a user interface of the management computer 112, which is sent to the storage controller 108. Flow ends at block 840.

Referring now to FIG. 9, a flowchart illustrating a code downgrade process with disabled features in accordance with embodiments of the present invention is shown. Flow begins at block 904.

At block 904, the storage controller 108 receives a downgrade firmware request 504. The down level firmware version 408 may be the immediately previous firmware version 408, or an older firmware version 408. Flow proceeds to block 908.

At block 908, the storage controller 108 determines the current firmware version 408 and the down level firmware version 408. In one embodiment, the processor 304 reads the version number 348 of firmware 336 to determine the firmware version 408. In a second embodiment, the processor 304 reads a time stamp 352 of firmware 336 to determine the firmware version 408. In a third embodiment, the processor 304 reads both the version number 348 and a time stamp 352 of firmware 336 to determine the firmware version 408. In a fourth embodiment, a user provides an indication of firmware version 408 from the management computer 112. Flow proceeds to block 912.

At block 912, the storage controller 108 determines which features 404 were implemented in the current and down level firmware versions 408. The processor 304 reads the feature scoreboard 340 in order to determine which features 404 are in the current and downgrade firmware versions 408. Flow proceeds to block 916.

At block 916, for each current feature 404 not implemented in the down level firmware version 408, the storage controller 108 determines if each feature 404 is currently in-use. The processor 304 reads the in-use scoreboard 344 to determine currently in-use features 404. Flow proceeds to decision block 920.

At decision block 920, the processor 304 determines if any not-implemented features 404 in the down level firmware version 408 are currently in-use. If any not implemented features are not in-use, then flow proceeds to block 924. If any not implemented features are in-use then flow proceeds to block 928.

At block 924, the storage controller 108 downgrades the firmware 336 as requested in the downgrade firmware request 504. In one embodiment, the down level firmware 336 is already in memory 308, and the processor 304 loads the down level firmware 336. In a second embodiment, the down level firmware 336 is stored on one or more storage devices 116, and the processor 304 loads the down level firmware 336 from the storage devices 116. In a third embodiment, a user loads downgrade firmware 336 into memory 308 from a management computer 112. Flow ends at block 924.

At block 928, the storage controller 108 provides a warning 520 to a user of feature incompatibility between the current firmware version 408 and the downgrade firmware version 408. The warning 520 is provided as an indication through a user interface of a management computer 112. Flow proceeds to decision block 932.

At decision block 932, the user chooses whether to disable an incompatible feature 404 between the current firmware version 408 and the down level firmware version 408. If the user does disable the incompatible feature 404, then flow proceeds to block 936. If the user does not disable the incompatible feature 404, then flow proceeds to block 944.

At block 936, the storage controller 108 clears the feature 404 from the in-use scoreboard 344. Flow proceeds to block 944.

At block 940, the user directs the storage controller 108 to perform the code downgrade. The user provides an indication through a user interface of the management computer 112, which is sent to the storage controller 108. Flow proceeds to block 944.

At block 944, the storage controller 108 downgrades the firmware 336 as requested in the downgrade firmware request 504. In one embodiment, the down level firmware 336 is already in memory 308, and the processor 304 loads the down level firmware 336. In a second embodiment, the down level firmware 336 is stored on one or more storage devices 116, and the processor 304 loads the down level firmware 336 from the storage devices 116. In a third embodiment, a user loads down level firmware 336 into memory 308 from a management computer 112. Flow ends at block 944.

At block 948, the storage controller 108 abandons the firmware downgrade. The user provides an indication 540 through a user interface of the management computer 112, which is sent to the storage controller 108. Flow ends at block 948.

Referring now to FIG. 10, a flowchart illustrating a code downgrade process with disabled features and hardware dependency in accordance with embodiments of the present invention is shown. Flow begins at block 1004.

At block 1004, the storage controller 108 receives a downgrade firmware request 504. The down level firmware version 408 may be immediately previous firmware version 408, or an older firmware version 408. Flow proceeds to block 1008.

At block 1008, the storage controller 108 determines the current firmware version 408 and the down level firmware version 408. In one embodiment, the processor 304 reads the version number 348 of firmware 336 to determine the firmware version 408. In a second embodiment, the processor 304 reads a time stamp 352 of firmware 336 to determine the firmware version 408. In a third embodiment, the processor 304 reads both the version number 348 and a time stamp 352 of firmware 336 to determine the firmware version 408. In a fourth embodiment, a user provides an indication of firmware version 408 from the management computer 112. Flow proceeds to block 1012.

At block 1012, the storage controller 108 determines which features 404 were implemented in the current and down level firmware versions 408. The processor 304 reads the feature scoreboard 340 in order to determine which features 404 are in the current and down level firmware versions 408. Flow proceeds to block 1016.

At block 1016, for each current feature not implemented in the down level firmware version 408 the storage controller 108 determines if each feature is currently in-use. The processor 304 reads the in-use scoreboard 344 to determine currently in-use features 404. Flow proceeds to decision block 1020.

At decision block 1020, the processor 304 determines if any not-implemented features in the down level firmware version 408 are currently in-use. If any not implemented features are not in-use, then flow proceeds to block 1024. If any not implemented features are in-use then flow proceeds to block 1028.

At block 1024, the storage controller 108 downgrades the firmware 336 as requested in the downgrade firmware request 504. In one embodiment, the down level firmware 336 is already in memory 308, and the processor 304 loads the down level firmware 336. In a second embodiment, the down level firmware 336 is stored on one or more storage devices 116, and the processor 304 loads the down level firmware 336 from the storage devices 116. In a third embodiment, a user loads down level firmware 336 into memory 308 from a management computer 112. Flow ends at block 1024.

At block 1028, the storage controller 108 provides a warning 520 to a user of feature incompatibility between the current firmware version 408 and the downgrade firmware version 408. The warning 520 is provided as an indication through a user interface of a management computer 112. Flow proceeds to decision block 1032.

At decision block 1032, the storage controller 108 determines if incompatible features 404 between the current firmware version 408 and the down level firmware version 408 are hardware-dependent features 420. The processor 304 reads the hardware dependent features 420 of the in-use scoreboard 344 in order to determine which of the incompatible features 404 are hardware-dependent features 420. If the feature 404 is a hardware-dependent feature 420, then flow proceeds to block 1052. If the feature 404 is not a hardware-dependent feature 420, then flow proceeds to decision block 1036.

At decision block 1036, the user chooses whether to disable an incompatible feature 404 between the current firmware version 408 and the down level firmware version 408. If the user does disable the incompatible feature 404, then flow proceeds to block 1040. If the user does not disable the incompatible feature 404, then flow proceeds to block 1052.

At block 1040, the storage controller 108 clears the feature 404 from the in-use scoreboard 344. Flow proceeds to block 1044.

At block 1044, the user directs the storage controller 108 to perform the code downgrade. The user provides an indication through a user interface of the management computer 112, which is sent to the storage controller 108. Flow proceeds to block 1048.

At block 1048, the storage controller 108 downgrades the firmware 336 as requested in the downgrade firmware request 504. In one embodiment, the down level firmware 336 is already in memory 308, and the processor 304 loads the down level firmware 336. In a second embodiment, the down level firmware 336 is stored on one or more storage devices 116, and the processor 304 loads the down level firmware 336 from the storage devices 116. In a third embodiment, a user loads down level firmware 336 into memory 308 from a management computer 112. Flow ends at block 1048.

At block 1052, the storage controller 108 abandons the firmware downgrade, and provides notification of the abandoned firmware downgrade 540 to the user. Flow ends at block 1052.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A method for downgrading firmware in a controller, comprising:

receiving a request, by the controller, to downgrade the firmware from a current version to an older version;

for a feature implemented in the current version and not implemented in the older version:

determining if the feature is currently in-use by the controller;

if the feature is currently in-use by the controller:

providing a warning of feature incompatibility between the current version and the older version to a user; and abandoning the request;

if the feature is not currently in-use by the controller:

checking other features implemented in the current version and not implemented in the older version and repeating determining, providing, abandoning, and checking; and downgrading the firmware, if all of the features implemented in the current version and not implemented in the older version are not currently in-use by the controller, wherein downgrading the firmware comprises executing, by the controller, the older version of firmware.

2. The method of claim 1, further comprising:

in response to receiving the request, determining which features are implemented in the current version and the older version.

3. The method of claim 1, wherein abandoning the request comprises notifying the user that the downgrade will not be performed.

4. The method of claim 1, wherein the older version is two or more versions older than the current version.

5. The method of claim 1, wherein in response to providing the warning to the user for the feature currently in-use by the controller, the method further comprising:

overriding, by the user, the warning; and downgrading , by the controller, the firmware wherein all warnings for in-use features implemented in the current version and not implemented in the older version have been overridden.

6. The method of claim 5, wherein overriding the warning comprises allowing the controller to downgrade the firmware without clearing an in-use indication for the feature in a memory of the controller.

7. The method of claim 1, wherein in response to providing the warning to the user for the feature currently in-use by the controller, the method further comprising:

disabling, by the user, the feature; and downgrading, by the controller, the firmware, wherein all in-use features implemented in the current version and not implemented in the older version are disabled prior to downgrading the firmware.

8. The method of claim 7, wherein disabling the feature comprises clearing the feature from an in-use scoreboard in a memory of the controller, wherein the in-use scoreboard is a data structure which identifies which of one or more features are currently in-use.

9. The method of claim 8, further comprising foregoing disabling the feature if the memory includes an indication of a hardware dependency for the feature.

10. A controller comprising firmware that supports downgrading from a current version of firmware to an older version of firmware, the controller comprising:

a processor; and an interface, coupled to the processor, wherein the interface provides control and status interaction with a user, wherein the interface receives a request to downgrade the firmware from a current version to the older version;

in response to the interface receives the request, for a feature implemented in the current version and not implemented in the older version, the processor determines if the feature is currently in-use by the controller;

if the feature is currently in-use by the controller, the processor provides a warning of feature incompatibility between the current version and the older version to the user through the interface and abandons the request; and if the feature is not currently in-use by the controller, the processor checks other features implemented in the current version and not implemented in the older version and repeats determines, provides, abandons, and checks, and the processor downgrades the firmware if all of the features implemented in the current version and not implemented in the older version are not currently in-use by the controller, wherein the processor downgrades the firmware comprises executing, by the controller, the older version of firmware.

11. The controller of claim 10, further comprising:

in response to the interface receives the request, the processor determines which features are implemented in the current version and the older version.

12. The controller of claim 10, wherein the processor abandons the request comprises the processor notifies the user through the interface that the downgrade will not be performed.

13. The controller of claim 10, wherein the older version is two or more versions older than the current version.

14. The controller of claim 10, wherein in response to the processor provides the warning to the user for the feature currently in-use by the controller, the user overrides the warning through the interface and the processor downgrades the firmware, wherein the user has overridden all warnings for in-use features implemented in the current version and not implemented in the older version.

15. The controller of claim 14, wherein the user overrides the warning comprises the processor downgrades the firmware without clearing an in-use indication in a memory of the controller for the feature, wherein the memory is coupled to the processor.

16. The controller of claim 10, wherein in response to the processor provides the warning to the user for the feature currently in-use by the controller, the user disables the feature and the processor downgrades the firmware, wherein all in-use features implemented in the current version and not implemented in the older version are disabled prior to the processor downgrades the firmware.

17. The controller of claim 16, wherein the user disables the feature comprises clearing the feature from an in-use scoreboard in a memory of the controller, wherein the memory is coupled to the processor, wherein the in-use scoreboard is a data structure which identifies which of one or more features are currently in-use.

18. The controller of claim 17, further comprising the user foregoes disabling the feature if the memory includes an indication of a hardware dependency for the feature.

19. A method for selectively downgrading firmware in a controller, comprising:

receiving a request, by the controller, to downgrade the firmware from a current version to an older version;

for each feature implemented in the current version and not implemented in the older version:

determining if the feature is currently in-use by the controller;

if the feature is currently in-use by the controller:

providing a warning of feature incompatibility between the current version and the older version to a user; and abandoning the request;

if the feature is not currently in-use by the controller:

downgrading the firmware, if all of the features implemented in the current version and not implemented in the older version are not currently in-use by the controller, wherein after providing the warning to the user, the user disabling the feature and providing an indication to the controller that the feature is disabled, wherein in response to receiving the indication, clearing the feature from an in-use scoreboard in a memory of the controller, wherein features not currently in-use by the controller are cleared from the in-use scoreboard, wherein the in-use scoreboard is a data structure which identifies which of one or more features are currently in-use.

20. The method of claim 19, further comprising:

allowing clearing the feature from the in-use scoreboard only if there is not an indication in the memory of a hardware dependency associated with the feature.

* * * * *